UNITED STATES PATENT OFFICE.

THOMAS WAKEFIELD, OF FILLMORE, NEW YORK.

COMPOSITION OF MATTER.

1,293,585. Specification of Letters Patent. Patented Feb. 4, 1919.

No Drawing. Application filed December 5, 1916. Serial No. 135,257.

*To all whom it may concern:*

Be it known that I, THOMAS WAKEFIELD, a citizen of Great Britain, residing at Fillmore, in the county of Allegany and State of New York, have invented a new and useful Composition of Matter, of which the following is a specification.

This invention relates to a composition of matter or a mixture for cleaning boilers. The object of the invention is to provide a composition or mixture which is cheap, and which will quickly and efficiently remove scale from boilers.

The mixture for achieving the above object consists of urine, sal-soda and crude oil. The proportions in which the above ingredients are mixed and the manner of mixing the same are substantially as follows: one-half pint of urine, five pounds of sal-soda, and one-eighth pint of crude oil dissolved or mixed with one gallon of water.

The composition or mixture with the ingredients thereof in the proportions above stated when placed in the boiler will not escape with the steam in the boiler so as to effect any of the gaskets or joints in the steam line.

I have found that the presence of urine in the mixture saturates the scale and works under it until it causes the scale to burst or crack, thus freeing the boiler from scale down to the iron. The sal-soda coöperates with the urine in thus freeing the boiler of scale.

The oil is used to coat the inside of the boiler to prevent pitting and corrosion. Crude oil is preferable because it is cheap, but especially because it has been found that it will not, as other oils do, form a scale, which is about as poor a conductor of heat as the lime scale that the mixture is intended to remove.

After the boilers have once been cleaned by my composition or mixture, they can be kept in good condition by adding a small amount only of the mixture from time to time. In certain cases where it is desired to simply scale the boilers, the crude oil may be omitted.

What is claimed is:—

1. A composition of matter for removing scale from boilers composed of urine and sal-soda mixed with water, substantially as described.

2. A composition of matter for removing scale from boilers composed of urine, and sal-soda mixed with water in substantially the following proportions; namely, to one gallon of water a half pint of urine and five pounds of sal-soda.

In testimony that I claim the foregoing as my own, I have hereto affixed my signature in the presence of two witnesses.

THOMAS WAKEFIELD.

Witnesses:
HERBERT C. CLINE,
JOSEPH S. SCHUMACHER.

Copies of this patent may be obtained for five cents each, by addressing the "Commissioner of Patents, Washington, D. C."